United States Patent
Yang

(10) Patent No.: US 7,498,715 B2
(45) Date of Patent: Mar. 3, 2009

(54) METHOD AND STRUCTURE FOR AN OUT-OF PLANE COMPLIANT MICRO ACTUATOR

(76) Inventor: Xiao Yang, 19500 Pruneridge Ave. #6106, Cupertino, CA (US) 95014

( * ) Notice: Subject to any disclaimer, the term of this patent is extended or adjusted under 35 U.S.C. 154(b) by 0 days.

(21) Appl. No.: 11/555,063

(22) Filed: Oct. 31, 2006

(65) Prior Publication Data
US 2007/0103264 A1      May 10, 2007

Related U.S. Application Data

(60) Provisional application No. 60/732,010, filed on Oct. 31, 2005.

(51) Int. Cl.
*H02N 1/00* (2006.01)
(52) U.S. Cl. ....... 310/309
(58) Field of Classification Search ........ 310/309
See application file for complete search history.

(56) References Cited

U.S. PATENT DOCUMENTS

| | | | | |
|---|---|---|---|---|
| 5,610,414 A * | 3/1997 | Yoneda et al. | ...... | 257/99 |
| 5,729,074 A * | 3/1998 | Shiomi et al. | ...... | 310/309 |
| 6,263,736 B1 * | 7/2001 | Thundat et al. | ...... | 73/514.36 |
| 6,485,273 B1 * | 11/2002 | Goodwin-Johansson | . | 417/410.2 |
| 6,753,664 B2 * | 6/2004 | Neufeld et al. | ...... | 318/116 |
| 6,933,165 B2 * | 8/2005 | Musolf et al. | ...... | 438/50 |
| 7,019,434 B2 * | 3/2006 | Helmbrecht | ...... | 310/309 |
| 2003/0058069 A1 * | 3/2003 | Schwartz et al. | ...... | 335/78 |
| 2003/0184189 A1 * | 10/2003 | Sinclair | ...... | 310/309 |
| 2004/0017644 A1 * | 1/2004 | Goodwin-Johansson | .... | 361/233 |
| 2004/0056742 A1 * | 3/2004 | Dabbaj | ...... | 335/78 |
| 2006/0192465 A1 * | 8/2006 | Kornbluh et al. | ...... | 310/800 |

FOREIGN PATENT DOCUMENTS

JP          10-209527       * 7/1998

* cited by examiner

*Primary Examiner*—Thomas M Dougherty
(74) *Attorney, Agent, or Firm*—Townsend and Townsend and Crew LLP

(57) ABSTRACT

This present invention relates generally to manufacturing objects. More particularly, the invention relates to a method and structure for fabricating an out-of-plane compliant micro actuator. The compliant actuator has large actuation range in both vertical and horizontal planes without physical contact to the substrate. Due to fringe field actuation, the compliant actuator has no pull-in phenomenon and requires low voltage by a 'zipping' movement compared to conventional parallel plate electrostatic actuators. The method and device can be applied to micro actuators as well as other devices, for example, micro-electromechanical sensors, detectors, fluidic, and optical systems.

9 Claims, 8 Drawing Sheets

Side view

Top view

METHOD AND STRUCTURE FOR AN OUT-OF PLANE COMPLIANT MICRO ACTUATOR

CROSS-REFERENCES TO RELATED APPLICATIONS

This application claims priority to provisional application Ser. No. 60/732,010; filed on Oct. 31, 2005; commonly assigned, and of which is hereby incorporated by reference for all purposes.

BACKGROUND OF THE INVENTION

This present invention relates generally to manufacturing objects. More particularly, the invention relates to a method and structure for fabricating an out-of-plane compliant micro actuator. The method and device can be applied to micro actuators as well as other devices, for example, micro-electromechanical sensors, detectors, fluidic, and optical systems.

Micro Electro Mechanical Systems (MEMS) is a rapidly emerging technology combining electrical, electronic, mechanical, optical, material, chemical, and fluids engineering disciplines. A common MEMS actuator is the electrostatic comb drive which consists of rows of interlocking teeth; half of the teeth are attached to a fixed "beam", the other half attach to a movable compliant beam assembly. Both assemblies are electrically insulated. By applying an opposite polarity voltage to both parts the resultant electrostatic force attracts the movable compliant beam towards the fixed.

As merely an example, some conventional MEMS actuators have utilized various comb drives designs, such as the movable compliant beam is in-plane with the fixed beam. In some of these designs, the movable compliant beam are out of plane relative to the fixed beam and rotates in and out of the fixed beam. However, in these designs, comb drives are rigid structures and have short actuation range or stroke. Thus, there is a need in the art for methods and apparatus for fabricating an out-of-plane compliant micro actuator with large actuation range.

SUMMARY OF THE INVENTION

According to the present invention, techniques for manufacturing objects are provided. More particularly, the invention provides a method and device for fabricating an out-of-plane compliant micro actuator. The method and device can be applied to micro actuators as well as other devices, for example, micro-electromechanical sensors, detectors, fluidic, and optical systems.

According to a specific embodiment of the present invention, a structure of an out-of-plane compliant micro actuator is provided. The structure includes a substrate member and a movable compliant actuator member anchored at one end to the substrate. The movable compliant actuator member is a stressed film or a stack of films with different Coefficient of Thermal Expansion (CTE). The neutral position of the movable compliant actuator is a curvature where the internal stress of the film balances a mechanical spring force of the curved film.

A plurality of openings are spatially disposed along the movable compliant actuator. The openings overlap a plurality of fixed electrode members on the substrate. A voltage potential applied between the electrodes and the movable compliant actuator creates fringe electrical field between the opening edges and electrode edges. The fringe electrical field results in an electrostatic force that attracts the movable compliant actuator member to the fixed electrodes. The openings are larger than the electrodes and encircle the electrodes without contact when the curved movable compliant member flattens by the electrostatic force.

According to another embodiment of the present invention, the substrate is a silicon wafer with Integrated Circuits (IC). The IC drives the movement of the actuator and controls the position of the actuator. According to an alternative embodiment of the present invention, the substrate is a glass with Thin Film Transistors (TFT). The TFT drives the movement of the actuator and controls the position of the actuator.

Many benefits are achieved by way of the present invention over conventional techniques. For example, the present technique provides an easy to use process that relies upon conventional technology. In some embodiments, the method provides for a micro actuator with large actuation range or stroke in both vertical and horizontal planes. In other embodiments, the method provides for a micro actuator without physical contact to any other members of the substrate. The non-contact nature of the actuation avoids common stiction and wear in MEMS devices that surfer long-term reliability issues. Furthermore, the fringe field actuation has no pull-in phenomenon associated with conventional electrostatic actuation. In other embodiments, the 'zipping' actuation of the movable compliant member requires low voltage compared to conventional parallel plate electrostatic actuators.

Additionally, the method provides a process that is compatible with conventional process technology without substantial modifications to conventional equipment and processes. Preferably, the invention provides for an improved integrated structure including integrated circuits and out-of-plane compliant micro actuator for various applications. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for manufacturing objects are provided. More particularly, the invention provides a method and device for fabricating an out-of-plane compliant micro actuator. The method and device can be applied to micro actuators as well as other devices, for example, micro-electromechanical sensors, detectors, fluidic, and optical systems.

Figure 1A:
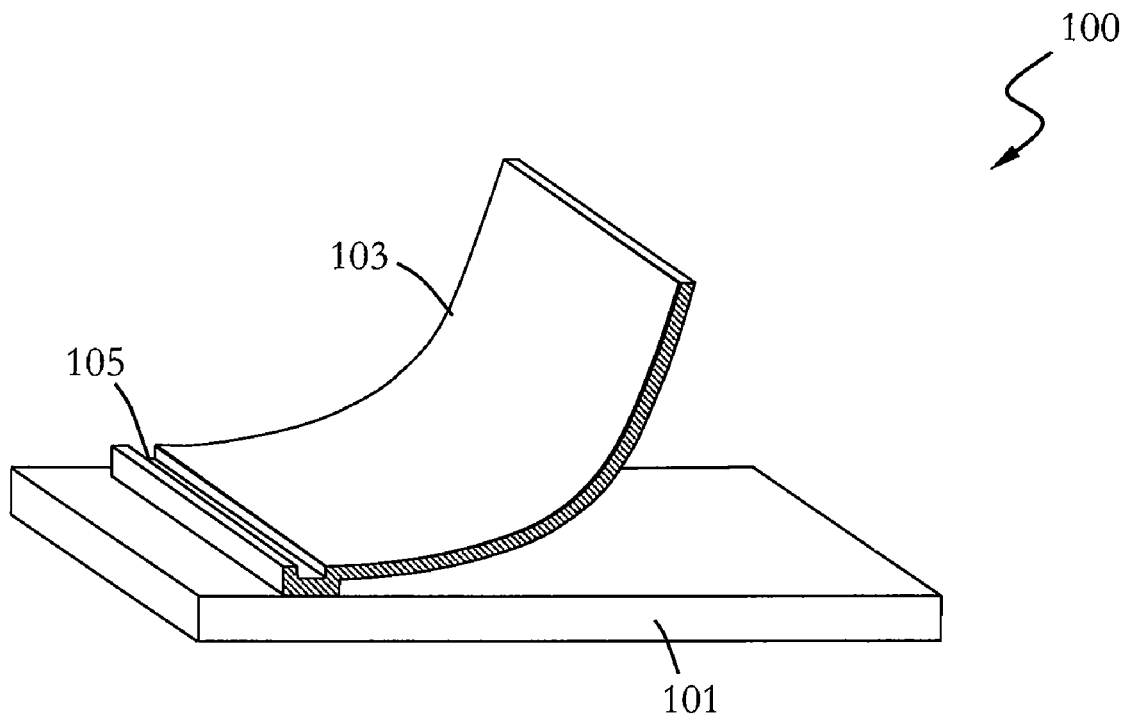
FIG. 1A is a perspective view of an out-of-plane mechanical structure or a flap according to one embodiment of the present invention.
Figure 1B:
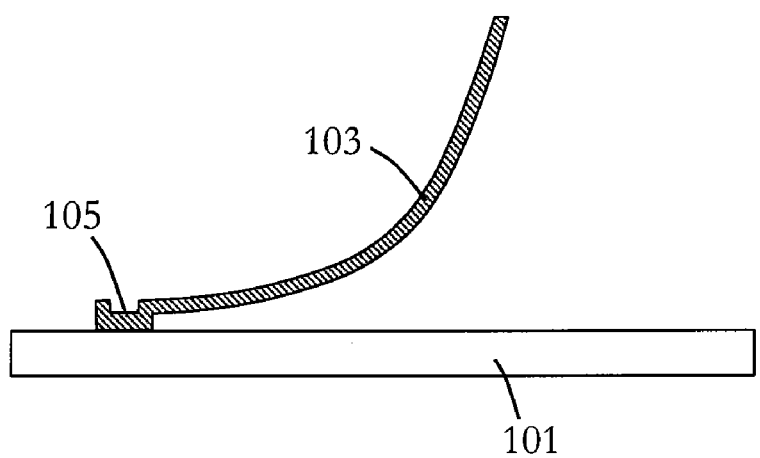
FIG. 1B is a simplified side-view illustration of the out-of-plane flap according to one embodiment of the present invention.

FIG. 1A is a simplified 3-D diagram illustrating components of an out-of-plane mechanical structure or a flap according to one embodiment of the present invention. As shown, the out-of-plane mechanical structure 103 is coupled to a substrate 101 at the one end by an anchor 105. According to one embodiment of the present invention, the movable compliant actuator member is composed of a stressed film such as Aluminum, Titanium, TiN, Copper, amorphous Silicon, poly Silicon, single crystal Silicon, SiO2, Si3N4, or metal alloy. According to another embodiment of the present invention, the movable compliant actuator is a stack of films with different Coefficient of Thermal Expansion (CTE) such as Aluminum/Ti, Aluminum/TiN, TiN/amorphous Silicon. The neutral position of the movable compliant actuator is a curvature where the internal stress of the film balances a mechanical spring force of the curved film. FIG. 1B is a simplified side view of the out-of-plane mechanical structure.

Figure 2A:
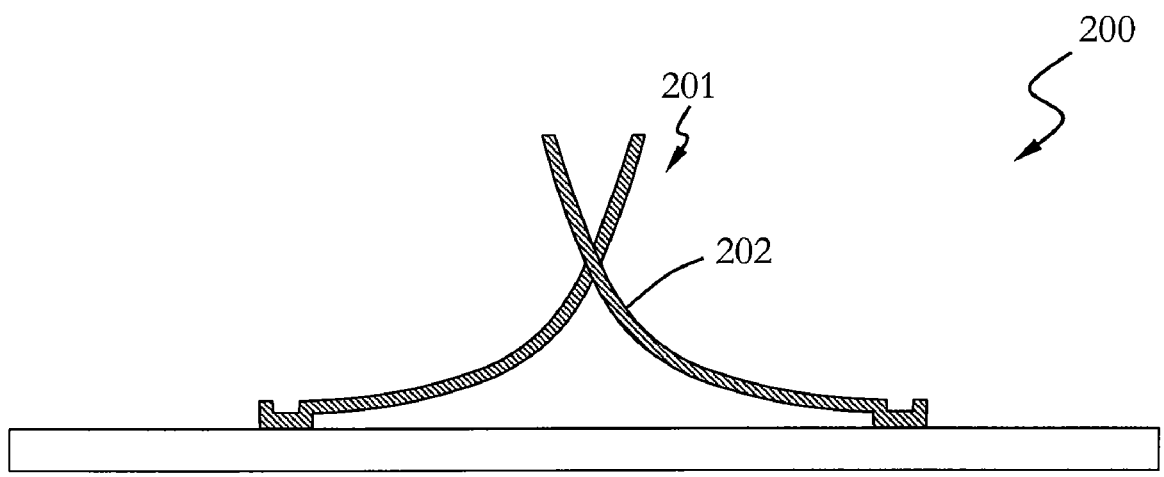
FIG. 2A is simplified side-view illustration of the out-of-plane flap structure in an "up" position or neutral position according to one embodiment of the present invention.
Figure 2B:
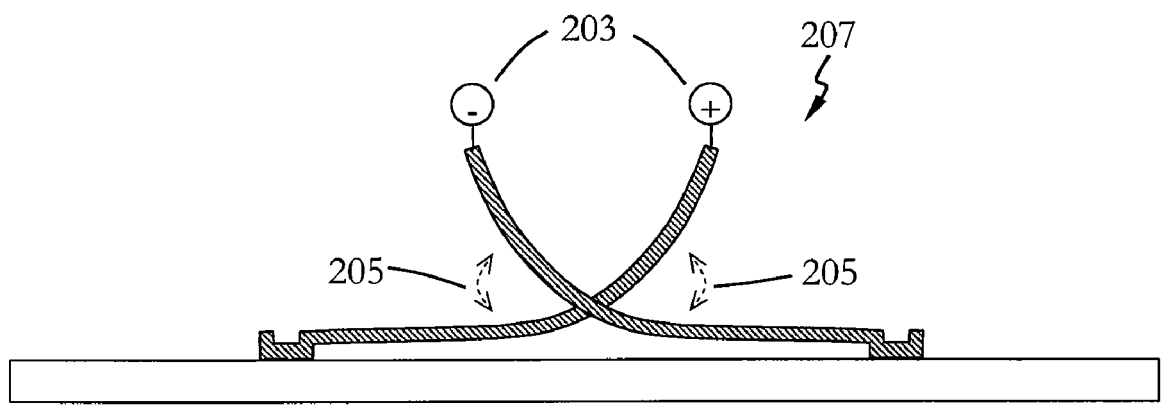
FIG. 2B is simplified side-view illustration of the out-of-plane flap structure in an intermediate position according to one embodiment of the present invention.
Figure 2C:
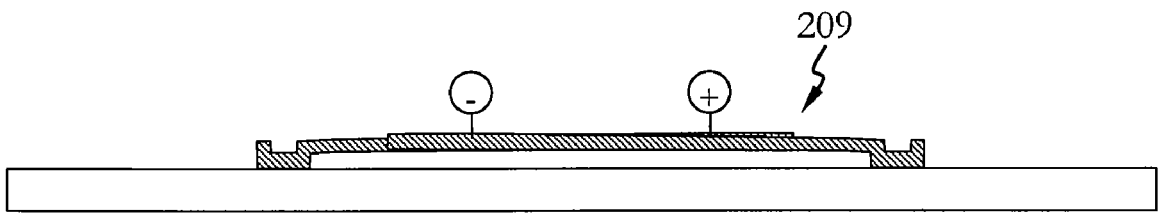
FIG. 2C is simplified side-view illustration of the out-of-plane flap structure in a "down" position according to one embodiment of the present invention.

FIG. 2 is simplified side diagrams illustrating components of an out-of-plane compliant comb drive device according to one embodiment of the present invention. As depicted in FIG. 2A, the "up" position 201 is the neutral position of the curved flap structures or comb fingers 202. When a voltage potential 203 is applied between the two comb finger or electrodes as shown in FIG. 2B, the comb fingers are attracted to each other to an intermediate position 207 by an electrostatic force induced by fringe fields 205 between the comb finger electrodes. The comb fingers eventually reach a final flat position 209 where the electrostatic forces balances the mechanical restoring force of the stressed film as illustrated in FIG. 2C.

Figure 3A:
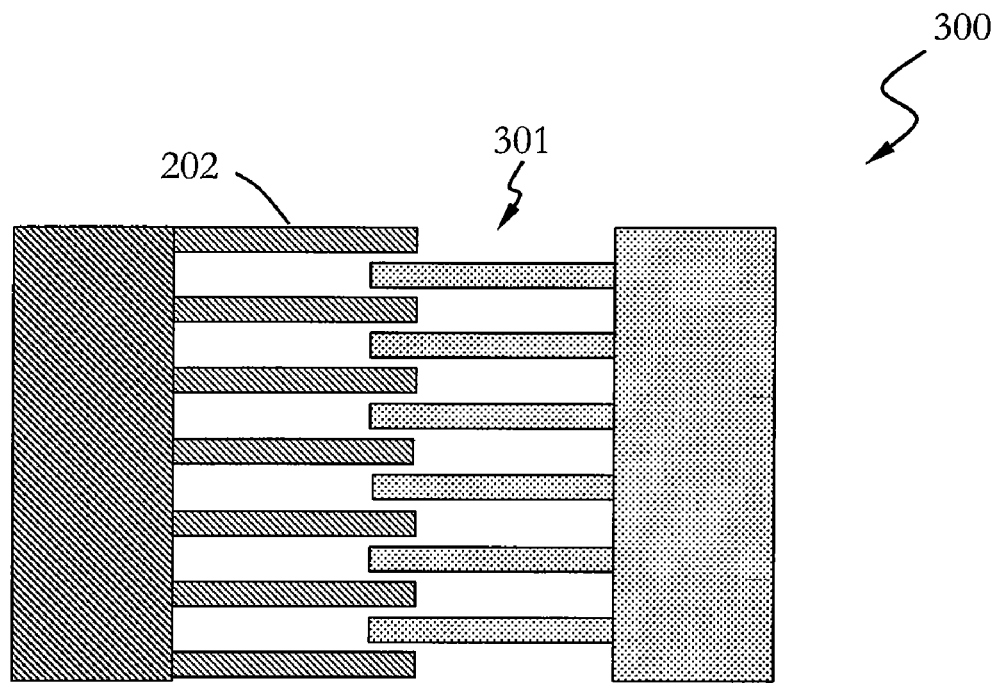
FIG. 3A is simplified top-view illustration of opposite comb fingers are interlaced with each other in an "up" or neutral position according to one embodiment of the present invention.
Figure 3B:
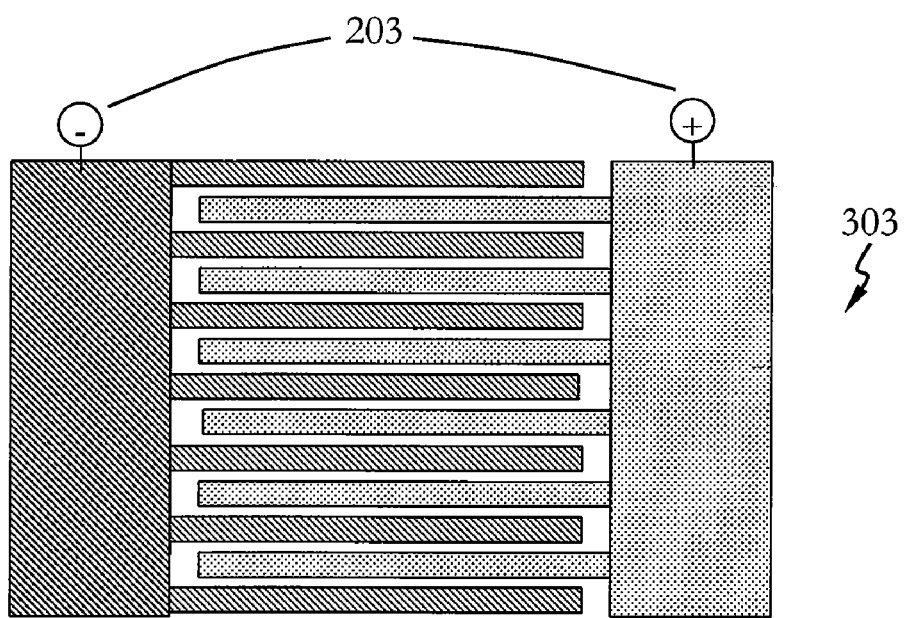
FIG. 3B is simplified top-view illustration of opposite comb fingers are interlaced with each other in a "down" position according to one embodiment of the present invention.

FIG. 3 is simplified top view diagrams illustrating components of an out-of-plane compliant comb drive device according to one embodiment of the present invention. As depicted in FIG. 3A, the opposite comb fingers 202 are interlaced with each other, however, without contact. In the "up" position, the comb fingers are curved and have little over lap portion to each other from the top view 301. When a voltage potential 203 is applied between the opposite comb fingers, they attracted to each other by an electrostatic force induced by fringe fields between the comb fingers and reach a final flat position 303 where the electrostatic forces balances the mechanical restoring force of the stressed film as illustrated in FIG. 3B.

Figure 4:
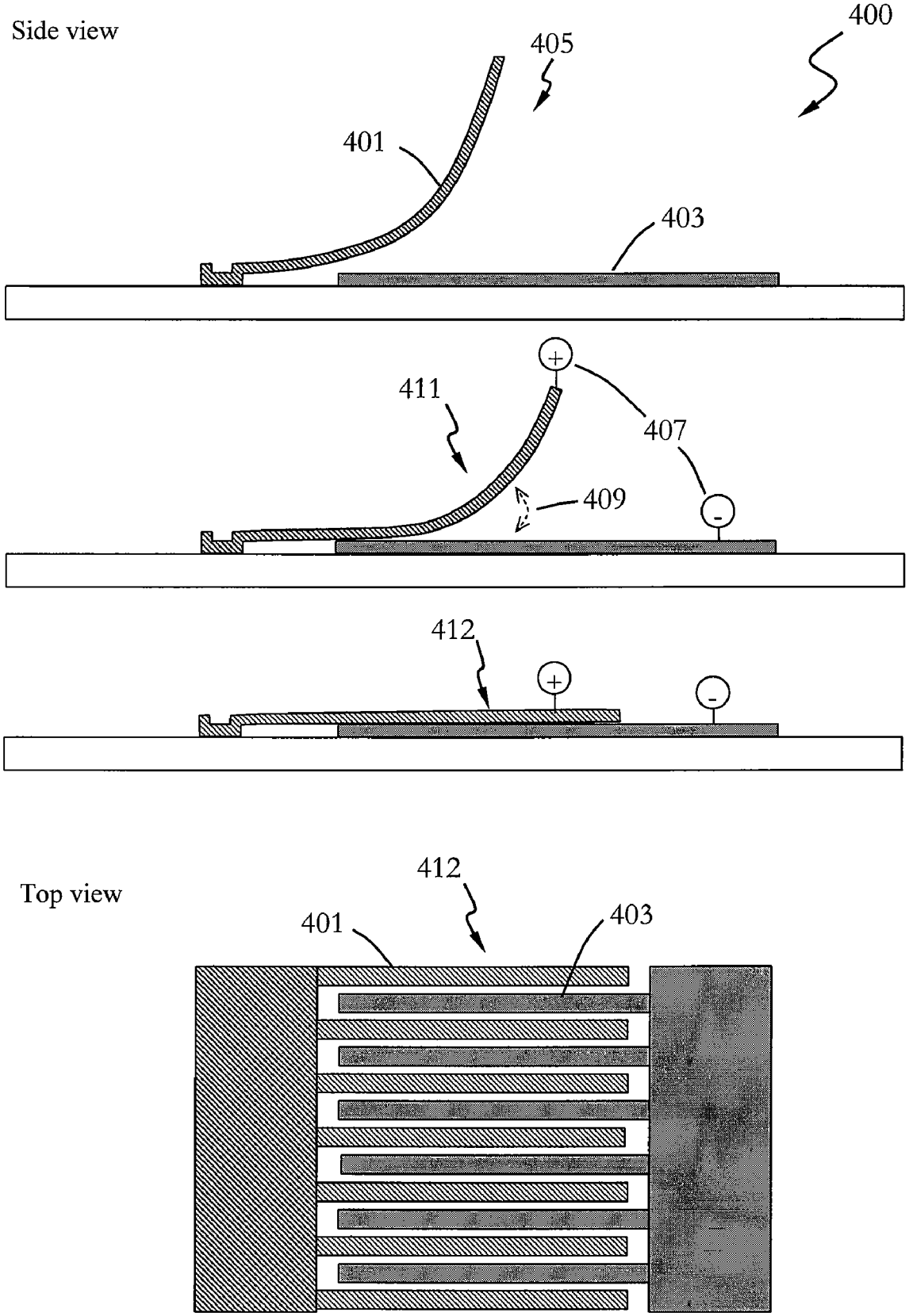
FIG. 4 is simplified diagrams illustrating components and operation of an out-of-plane compliant comb drive device according to one embodiment of the present invention.

FIG. 4 is simplified diagrams illustrating components and operation of an out-of-plane compliant comb drive device according to one embodiment of the present invention. As depicted in the top-view diagram, the comb on the left 401 is flexible or movable compliant, where as the one on the right 403 is fixed. When no voltage potential is applied between the two combs, the flexible comb is in an "up" or neutral position 405. When a voltage potential 407 is applied between the two combs, the movable compliant comb structure is attracted to the fixed comb structure to an intermediate position 411 by an electrostatic force induced by fringe fields between the comb fingers. The movable compliant comb eventually reach a final flat position 412 parallel to the fixed electrodes as illustrated in the side and top view diagrams.

Figure 5:
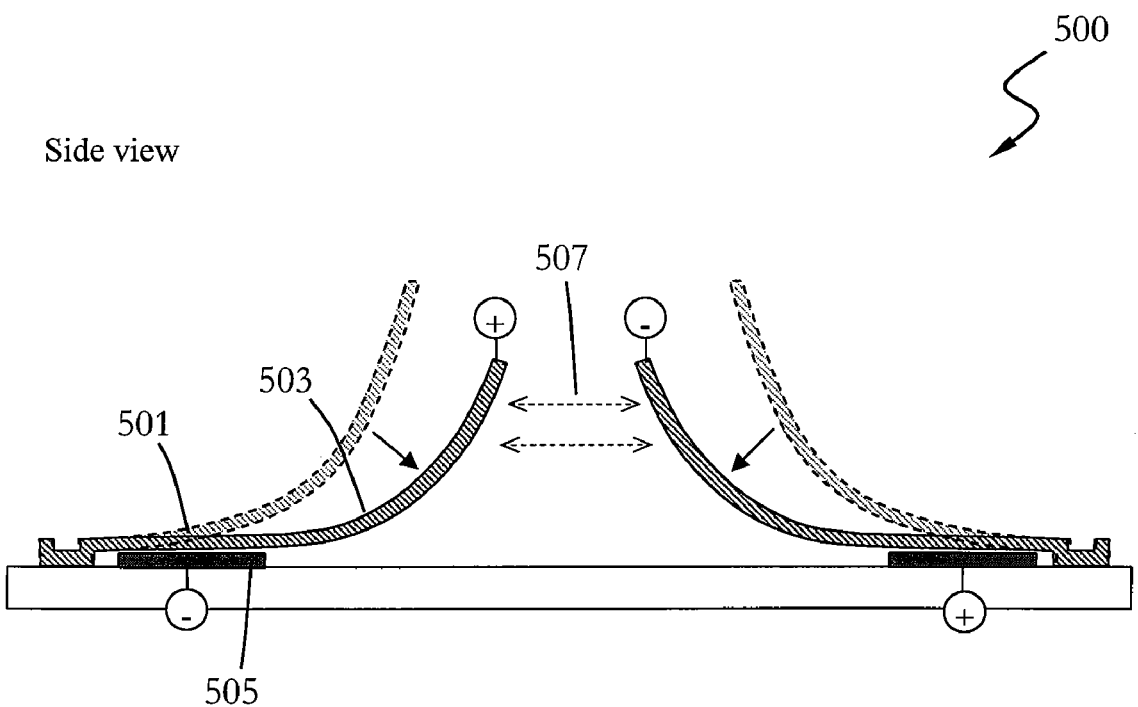
FIG. 5 is simplified diagrams illustrating components and operation of an out-of-plane compliant comb drive device according to one embodiment of the present invention.
Figure 5:
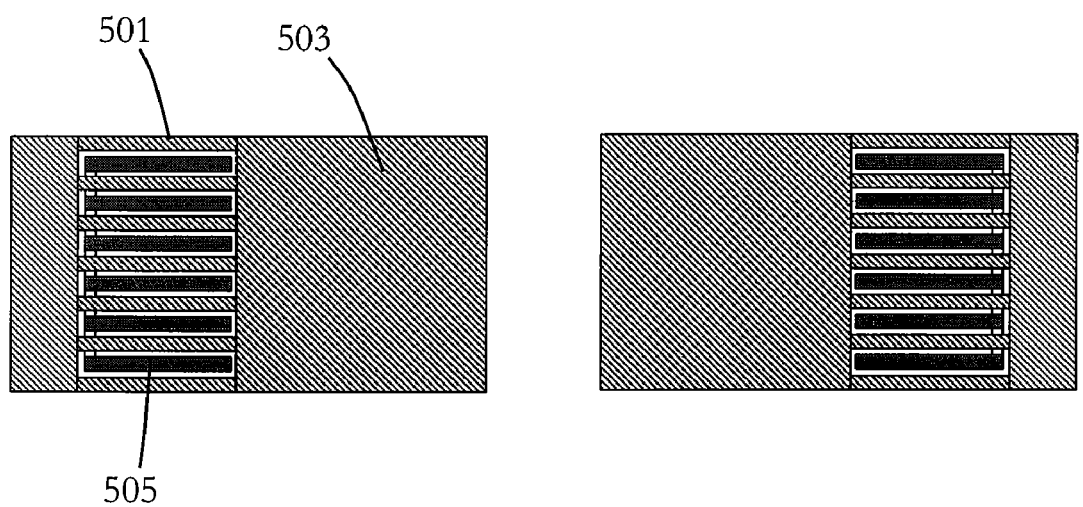

FIG. 5 is simplified diagrams illustrating components and operation of an out-of-plane compliant comb drive device according to one embodiment of the present invention. As depicted in the side and top view diagrams, the flexible or movable compliant structure has two portions: a perforated comb portion 501 that is close to the anchor and a continuous portion 503. The comb portion has a matching fixed comb 505. When a voltage potential is applied, the comb portion is attracted to the fixed comb by fringe field similar to actuation mechanism described above. The two continuous portions of opposite side face each other and are attracted to each other largely by a direct electric field 507.

Figure 6:
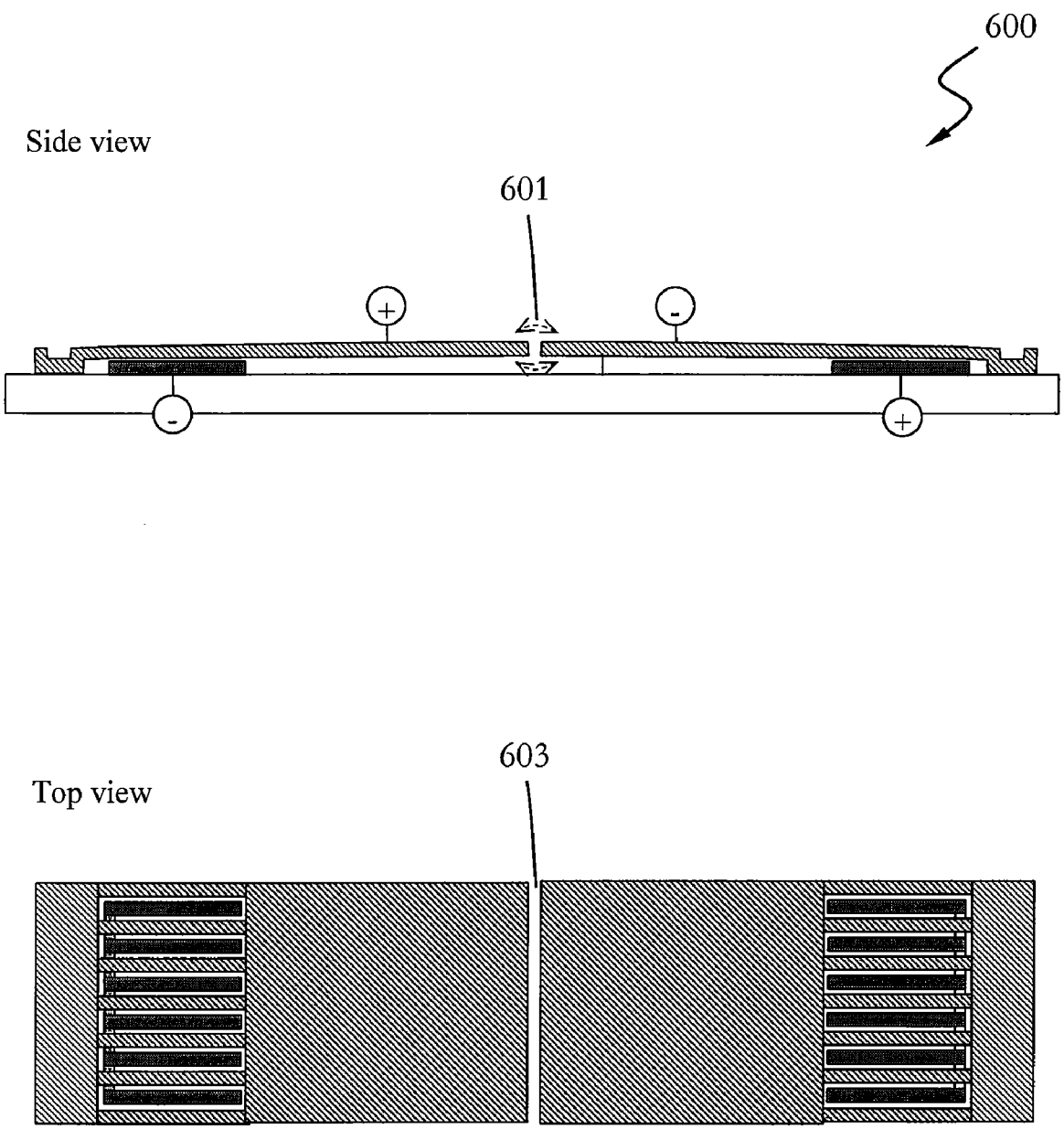
FIG. 6 is simplified diagrams illustrating components and operation of an out-of-plane compliant comb drive device according to one embodiment of the present invention.

As the curved movable compliant structures become fatter, the facing area become smaller, which results in a smaller direct electric field, and the fringe field 601 between the edges becomes dominating attracting force. At the final flat position 603, the two actuators are attracted to each other largely by a fringe electric field as illustrated in FIG. 6.

Figure 7:
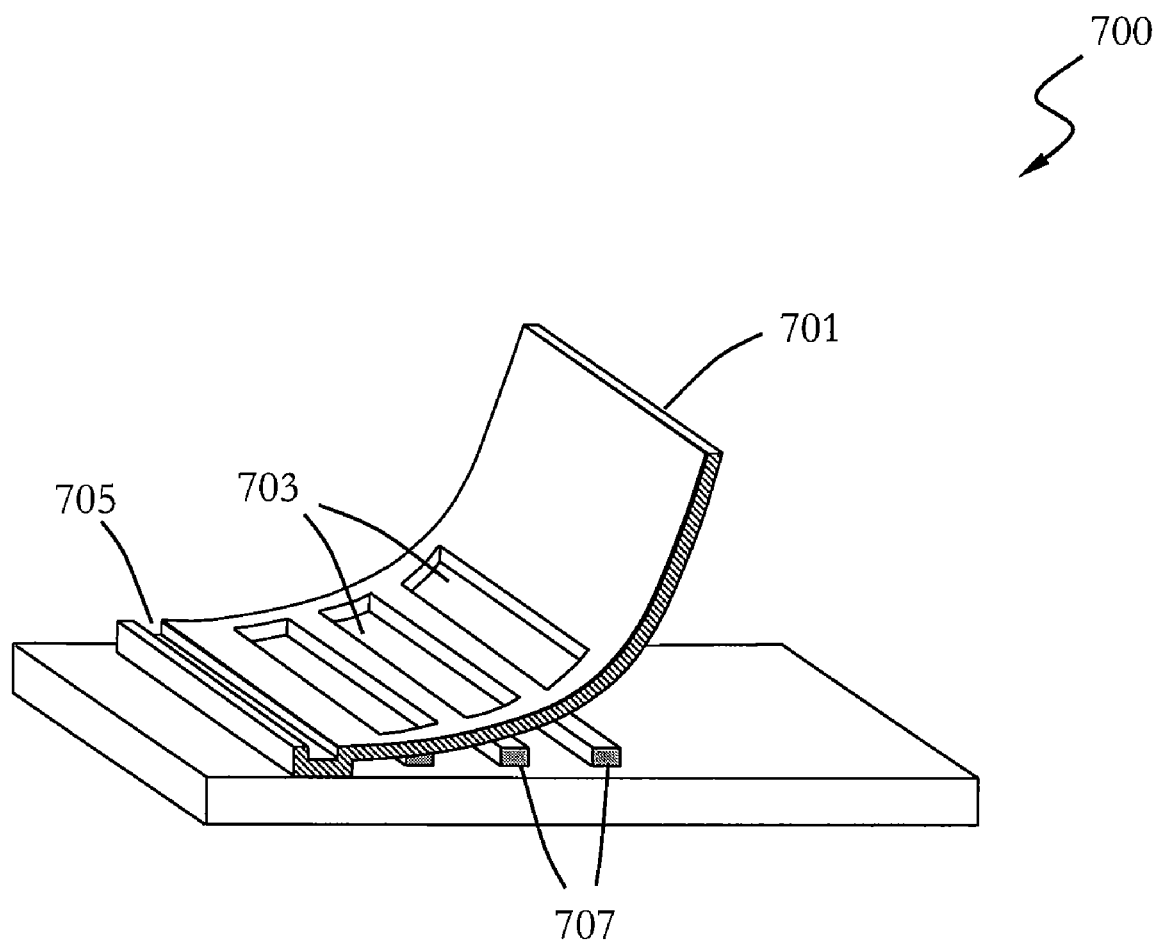
FIG. 7 is a simplified perspective view of an out-of-plane compliant actuator device according to one embodiment of the present invention.

FIG. 7 is a simplified 3-D diagram illustrating components of an out-of-plane compliant actuator device according to one embodiment of the present invention. As depicted, the curved structure 701 has a plurality of cut-outs or openings 703 parallel to the anchor 705. The openings overlap with the fixed electrodes 707 on the substrate to form a pair of electrodes.

Figure 8:
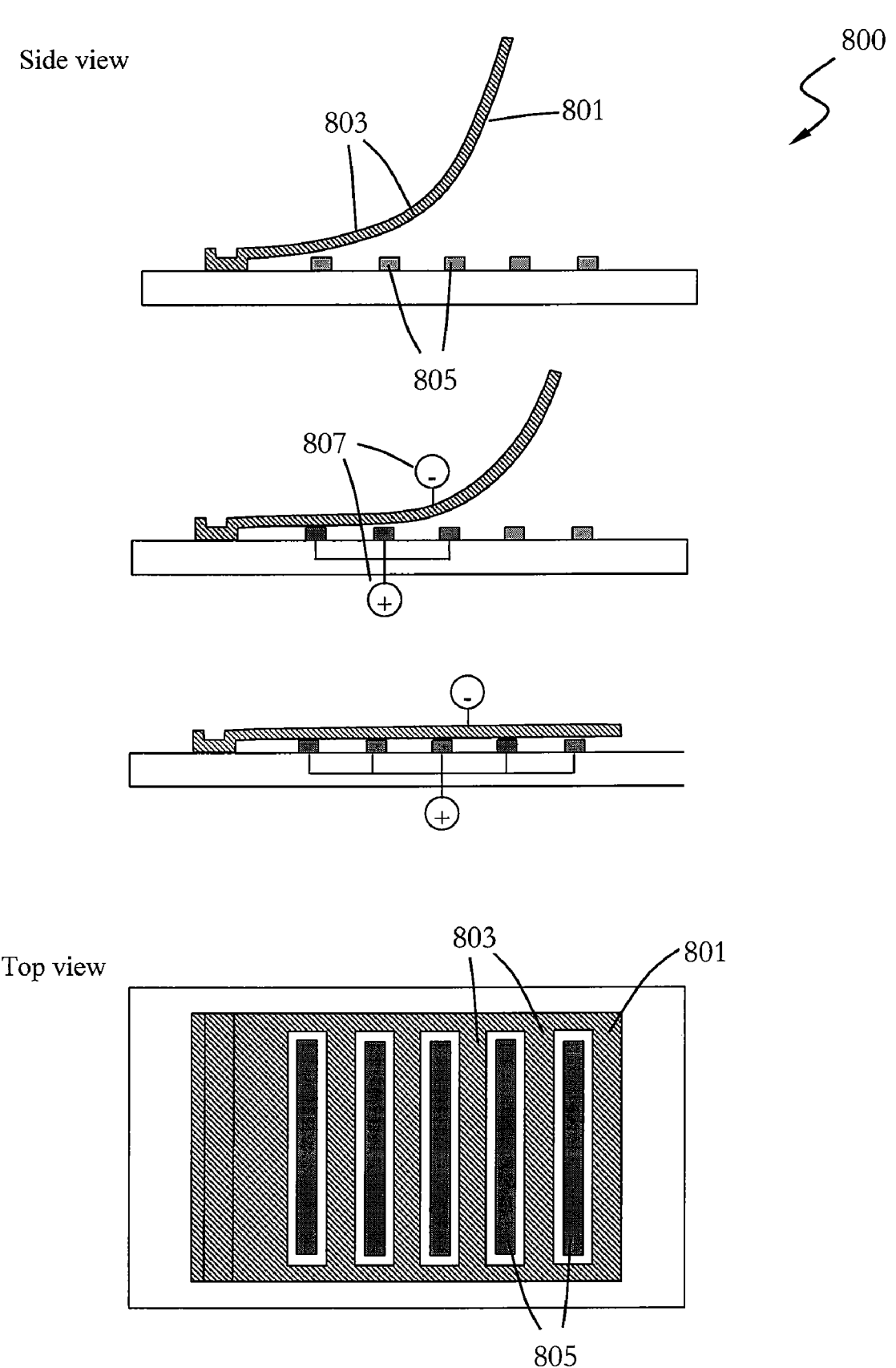
FIG. 8 is simplified diagrams illustrating components and operation of an out-of-plane compliant actuator device according to one embodiment of the present invention.

FIG. 8 is simplified diagrams illustrating components and operation of an out-of-plane compliant actuator device according to one embodiment of the present invention. As depicted in the side view diagrams, the movable compliant electrode 801 is attracted to the fixed electrodes 805 by fringe fields when a voltage potential 807 is applied between them. The movable compliant electrode eventually reach a final flat position parallel to the fixed discrete electrodes as illustrated in the side and top view diagrams.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An actuator device, the actuator device comprising:
a substrate member, the substrate member comprising a surface region;
a movable compliant actuator member having a fixed end, a free end, and a length formed between the fixed end and the free end, the fixed end being coupled to a portion of the surface region, the actuator member having at least a first state at a first spatial position and a second state at a second spatial position, the free end being at the first spatial position during the first state, the first spatial position being a first predetermined height normal to the surface region and the second spatial position being a second predetermined height normal to the surface region;

an arc region defining a path between the first spatial position and the second spatial position, the actuator member being in a stressed state at the second spatial position, the stressed state being in a direction toward the first spatial position;

a plurality of electrode members spatially disposed along a first region of the surface region and a second region of the surface region, the first region being within a vicinity of the portion of the surface region coupled to the fixed end of the movable compliant actuator member;

whereupon one or more of the electrodes is capable of being biased relative to the movable compliant actuator to cause the movable compliant actuator member to move along the arc region from the first spatial position to the second spatial position; and wherein the actuator member comprises a plurality of openings therein, the plurality of openings being provided to form a pair of electrodes with the plurality of fixed electrode within the surface region.

2. The device of claim 1 wherein each of the electrodes is actuated to cause the movable compliant actuator member to be in the second spatial position.

3. The device of claim 1 wherein the actuator member, except for the fixed end, is free from physical contact with the surface region.

4. The device of claim 1 wherein each of the plurality of electrode members is characterized by a length and a width, the length being provided in a direction normal to the length of the actuator member.

5. The device of claim 1 wherein each of the plurality of electrode members is embedded within the surface region.

6. The device of claim 1 wherein the substrate comprises a silicon wafer including one or more integrated circuits.

7. The device of claim 1 wherein the substrate is a TFT glass substrate.

8. The device of claim 1 wherein the movable compliant actuator member is made of a stressed film selected from: Aluminum, Titanium, TiN, Copper, amorphous Silicon, poly Silicon, single crystal Silicon, SiO2, Si3N4, or metal alloy.

9. The device of claim 1 wherein the movable compliant actuator is a stack of films the stack of films selected from films of different Coefficient of Thermal Expansion (CTE) including Aluminum/Ti, Aluminum/TiN, TiN/amorphous silicon.

* * * * *